United States Patent
Hirano et al.

[11] Patent Number: 5,901,021
[45] Date of Patent: * May 4, 1999

[54] THIN-FILM MAGNETIC HEAD

[75] Inventors: Hitoshi Hirano, Nishinomiya; Keiichi Kuramoto, Kadoma; Yoichi Domoto, Hirakata; Seiichi Kiyama, Takatsuki, all of Japan

[73] Assignee: Sanyo Electric Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,180

[22] Filed: May 17, 1996

[30]  Foreign Application Priority Data

| May 19, 1995 | [JP] | Japan | ................................. 7-121233 |
| May 19, 1995 | [JP] | Japan | ................................. 7-121234 |
| Apr. 17, 1996 | [JP] | Japan | ................................. 8-095514 |

[51] Int. Cl.⁶ .............................. G11B 5/31; G11B 5/255
[52] U.S. Cl. ............................................. 360/122; 360/126
[58] Field of Search .................................. 360/103, 120, 360/122, 125, 126, 127, 119

[56]  References Cited

U.S. PATENT DOCUMENTS

| 5,266,409 | 11/1993 | Schmidt et al. | ........................ 360/112 |
| 5,331,493 | 7/1994 | Schwartz | .................................. 360/113 |
| 5,563,754 | 10/1996 | Gray et al. | .............................. 360/126 |
| 5,609,948 | 3/1997 | David et al. | ............................ 360/103 |

FOREIGN PATENT DOCUMENTS

| 3-500466 | 1/1991 | Japan . |
| 4-64920 | 2/1992 | Japan . |
| 6-195640 | 7/1994 | Japan . |
| 6-203328 | 7/1994 | Japan . |
| 6223331 | 8/1994 | Japan . |

OTHER PUBLICATIONS

"Oryoku Butsuri" vol. 66, No. 7 (1987), pp. 923–924.

*Primary Examiner*—David L. Ometz
*Attorney, Agent, or Firm*—Nikaido, Marmelstein, Murray & Oram LLP

[57]  ABSTRACT

A thin-film magnetic head includes an upper protective layer, a lower protective layer, and a head forming layer which is provided between the upper and lower protective layers, and the head forming layer further includes a recording head forming layer, a reproducing head forming layer, and a separation layer which is provided between the recording and reproducing head forming layers, while any one of the upper protective layer, the lower protective layer and the separation layer is formed by a diamond-like carbon coating.

26 Claims, 8 Drawing Sheets

(a)

(b)

(c)

(d)

(e)

SELF-BIAS VOLTAGE (V)

THIN-FILM MAGNETIC HEAD

BACKGROUND OF THE INVENTION

1. Field of the Invention

The present invention relates to a thin-film magnetic head which is applied to a magnetic disk unit or the like for moving relative to a magnetic recording medium and writing or reading information in or from the medium.

2. Description of the Background Art

A thin-film magnetic head, which has excellent frequency characteristics and is capable of high-density recording through refinement of the track width and the bit length, is employed as a magnetic head for recording and reproduction in a magnetic disk unit or the like.

Such a thin-film magnetic head is generally provided with protective layers for holding and protecting a head part. The material from which such protective layers are generally prepared is $Al_2O_3$. When a reproducing head and a recording head are provided independently of each other, a separation layer is provided between these heads. The material for such a separation layer is also generally prepared from $Al_2O_3$.

However, the hardness of $Al_2O_3$ is about 1000 to 2000 kg/mm$^2$, and hence the head part is disadvantageously damaged in grinding. In order to protect the head further, each protective layer must have a thickness of about 30 to 40 $\mu$m. Thus, a process of forming the protective layers disadvantageously requires a long time.

SUMMARY OF THE INVENTION

An object of the present invention is to provide a thin-film magnetic head which is excellent in heat protectiveness and wear resistance, and can reduce the manufacturing steps therefor.

A thin-film magnetic head according to a first aspect of the present invention comprises an upper protective layer, a lower protective layer, and a head forming layer which is provided between the upper and lower protective layers. At least one of the upper and lower protective layers is formed by a diamond-like carbon coating. Such a thin-film magnetic head is provided on its head forming layer with an inductive magnetic head for recording and reproduction, for example.

A thin-film magnetic head according to a second aspect of the present invention comprises an upper protective layer, a lower protective layer, and a head forming layer, provided between the upper and lower protective layers in which the head, forming layer comprises a recording head forming layer and a reproducing head forming layer being stacked with each other through a separation layer, and in which any one of the upper and lower protective layers and the separation layer is formed of a diamond-like carbon coating. This thin-film magnetic head is a merge type thin-film magnetic head which is provided on its recording and reproducing head forming layers with an inductive magnetic head for recording and an MR head for reproduction respectively, for example.

The diamond-like carbon coating of the present invention can be not only an amorphous diamond-like carbon coating, but also a crystalline diamond coating. The hardness (Hv) of the diamond-like carbon coating is preferably at least 2000 kg/mm$^2$. On the other hand, the specific resistance of the diamond-like coating is preferably at least $10^7$ $\Omega\cdot$cm.

When the diamond-like carbon coating in the present invention is amorphous and contains hydrogen, the hydrogen content is preferably at least 5%, more preferably at least 15 to 20%, where the term % stands for atomic percentage.

When the upper or lower protective layer is formed of a diamond-like carbon coating in the present invention, its thickness is preferably not more than 20 $\mu$m, more preferably 5 to 20 $\mu$m. When the separation layer is formed of a diamond-like carbon coating, on the other hand, its thickness is preferably about 1 to 10 $\mu$m.

In the present invention, the diamond-like carbon coating can contain at least one of Si, Al, Ti, Zr, and oxides and nitrides thereof, in order to relax internal stress of the diamond-like carbon coating for forming a thin film with excellent adhesion.

The diamond-like carbon coating of the present invention may be provided with a stress relaxation layer consisting of at least one of Si, Al, Ti, Zr and oxides and nitrides thereof. Such a stress relaxation layer may be provided as an intermediate layer between a layer serving as an underlayer for the diamond-like carbon coating and the diamond-like carbon coating, or interposed in the diamond-like carbon coating. Alternatively, a plurality of such stress relaxation layers may be interposed in the diamond-like carbon coating in a multilayer structure. The provision of such a stress relaxation layer in the diamond-like carbon coating relaxes the stress in thin-film formation of the diamond-like carbon coating, whereby it is possible to form the thin film with excellent adhesion.

In the thin-film magnetic head according to the present invention, the diamond-like carbon coating is employed for the upper protective layer, the lower protective layer or the separation layer. In general, such a diamond-like carbon coating is harder than generally employed $Al_2O_3$. Therefore, this coating is excellent in head protectiveness, during a grinding step or the like, as well as in wear resistance.

Further, the protective layer or the separation layer, the thickness of which can be reduced as compared with the conventional $Al_2O_3$ layer, can be formed in a shorter time, whereby the manufacturing steps can be reduced. Further, it is also possible to improve the yield in the manufacturing steps, corrosion resistance and the like.

In the thin-film magnetic head according to the present invention, the upper protective layer, the lower protective layer or the separation layer is formed by the diamond-like carbon coating. Such a diamond-like carbon coating is superior in wear resistance to the generally employed $Al_2O_3$ film. Therefore, this coating is excellent in head protectiveness during machining such as cutting or grinding, as well as in wear resistance during use.

Further, the thickness of this coating can be reduced as compared with coating of the prior art by employing the diamond-like carbon coating in accordance with the present invention. Therefore, the time for the step of forming a thin film can be reduced as compared with the prior art, whereby the manufacturing steps can be reduced.

When the diamond-like carbon coating in the present invention is formed on a substrate, its composition can be varied in the direction of its thickness between a portion around the interface between the coating and the substrate, i.e., the substrate side, and a portion around its surface, i.e., the surface side, so that the composition on the substrate side is excellent in adhesion with respect to the substrate and that on the coating surface side is rather inferior in adhesion but excellent in properties such as hardness etc. Such variation of the composition of the coating in the direction of its thickness can be expressed in terms of the hydrogen concentration in the coating. Further, the internal stress, hardness, conductivity, refractive index, etc. are varied due to such variation of the composition. Thus, such a diamond-like carbon coating can be expressed by specifying these characteristics.

The aforementioned diamond-like carbon coating is characterized in that its composition is so varied in the direction of its thickness that the hydrogen concentration is 60 to 40% around the interface between the same and the substrate, and 30 to 10% around its surface.

The aforementioned diamond-like carbon coating is characterized in that its composition is so varied in the direction of its thickness that its internal stress is 5 to 6 GPa around the interface between the same and the substrate, and 7 to 8 GPa around its surface.

The aforementioned diamond-like carbon coating is characterized in that its composition is so varied in the direction of its thickness that its hardness is 500 to 2000 Hv around the interface between the same and substrate, and 3000 to 3400 Hv around its surface.

The aforementioned diamond-like carbon coating is characterized in that its composition is so varied in the direction of its thickness that its conductivity is $10^{-4}$ to $10^{-7}$ $(\Omega cm)^{-1}$ around the interface between the same and substrate, and $10^{-10}$ to $10^{-11}$ $(\Omega cm)^{-1}$ around its surface.

The aforementioned diamond-like carbon coating is characterized in that its composition is so varied in the direction of its thickness that its refractive index is 1.0 to 1.5 around the interface between the same and substrate, and 2.0 to 2.5 around its surface.

The term % for the hydrogen concentration stands for atomic percentage, which can be measured with a secondary ion mass spectrometer (SIMS), for example. The internal stress can be measured from the amount of deformation of the substrate. When a film is formed on a thin substrate under stress, the substrate exhibits deflection which is determined by its shape and elastic coefficient, and hence the internal stress can be evaluated by detecting the amount of this deflection. This method is explained in "Oryoku Butsuri" Vol. 66, No. 7 (1987), pp. 923–924, for example. In this literature, the internal stress is calculated from the radius of curvature of deflection of a substrate obtained by the Newton's ring method.

The hardness of the coating is Vickers hardness, and the conductivity can be calculated by voltage/current characteristics across two metal electrodes which are formed on the coating. The refractive index can be calculated from measured values of transmittance and reflectance.

While the substrate is not restricted (the substrate; can be a silicon substrate or a glass substrate), the present invention is particularly useful for an Ni substrate, an Al substrate, a stainless steel substrate, a ceramics steel substrate, or a substrate comprising an alloy of Ni, Al or stainless steel, which has been generally inferior in adhesion.

The term "substrate" employed in this specification also includes a substrate which is provided with an underlayer or the like. Therefore, an Ni alloy substrate which is provided thereon with a silicon layer, for example, is also included as the substrate. In this case, the wording "around the interface between the coating and the substrate" indicates a portion around the interface between the coating and the underlayer such as the silicon layer.

The aforementioned diamond-like-carbon coating is characterized in that its composition is varied in the direction of its thickness. The composition of such a coating may be varied by stages through a multilayer structure having at least two layers, or continuously varied by an inclined structure.

A method of forming the aforementioned diamond-like carbon coating is not particularly restricted, but the coating can be formed by CVD, for example. It is possible to vary the composition of the diamond-like carbon coating in the direction of its thickness by employing plasma CVD for applying a high-frequency voltage to a substrate holder thereby varying a self-bias voltage which is generated in the substrate holder with the progress of formation of the coating, for example.

The feature of the aforementioned method resides in that a plasma containing reaction gas serving as the raw material for the diamond-like carbon coating is generated and the self-bias voltage generated in the substrate holder which is irradiated with this plasma is varied with the progress of formation of the coating.

The self-bias voltage which is generated in the substrate holder can be varied from 0 to –150 V, for example, in formation of a portion of the coating around the interface between the same and the substrate, i.e., between initial and final stages of formation of the coating, thereby varying the composition of the coating.

An electron cyclotron resonance (ECR) plasma CVD apparatus can be employed as plasma generation means in the plasma CVD. The density of the plasma can be further increased by employing such an apparatus, so that a high-quality coating can be formed at a low temperature.

In the aforementioned diamond-like carbon coating, its composition is so varied in the direction of its thickness that excellent adhesion is attained around the interface between the same and the substrate while excellent characteristics required for the diamond-like carbon coating such as hardness, conductivity and chemical stability are attained around its surface. Therefore, the aforementioned diamond-like carbon coating is excellent in adhesion with respect to the substrate, and has surface characteristics such as hardness.

The aforementioned diamond-like carbon coating can be provided with desired characteristics of a diamond-like carbon coating such as hardness, resistivity and chemical stability, along with excellent adhesion with respect to the substrate.

Further, the aforementioned diamond-like carbon coating can be directly formed on a substrate of a Ni alloy or the like, which substrate does not exhibit excellent adhesion in general, to attain excellent adhesion. Thus, a diamond-like carbon coating having excellent adhesion can be formed without complicating the manufacturing process.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
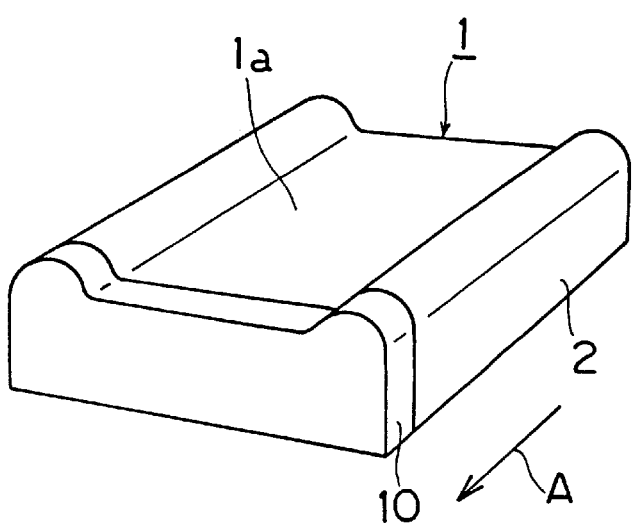
FIG. 2 is a perspective view showing the appearance of the thin-film magnetic head.

FIG. 2 is a perspective view showing a thin-film magnetic head 1 which is applied to a magnetic disk unit or the like. Referring to FIG. 2, the thin-film magnetic head 1 is prepared by stacking thin films forming the same on a substrate 2 consisting of Altic ($Al_2O_3$—TiC) or the like along arrow A, thereby forming a head part 10. The thin-film magnetic head 1 shown in FIG. 2 is arranged in a magnetic disk unit or the like so that its slider surface 1a is opposed to a magnetic recording medium.

Figure 1:
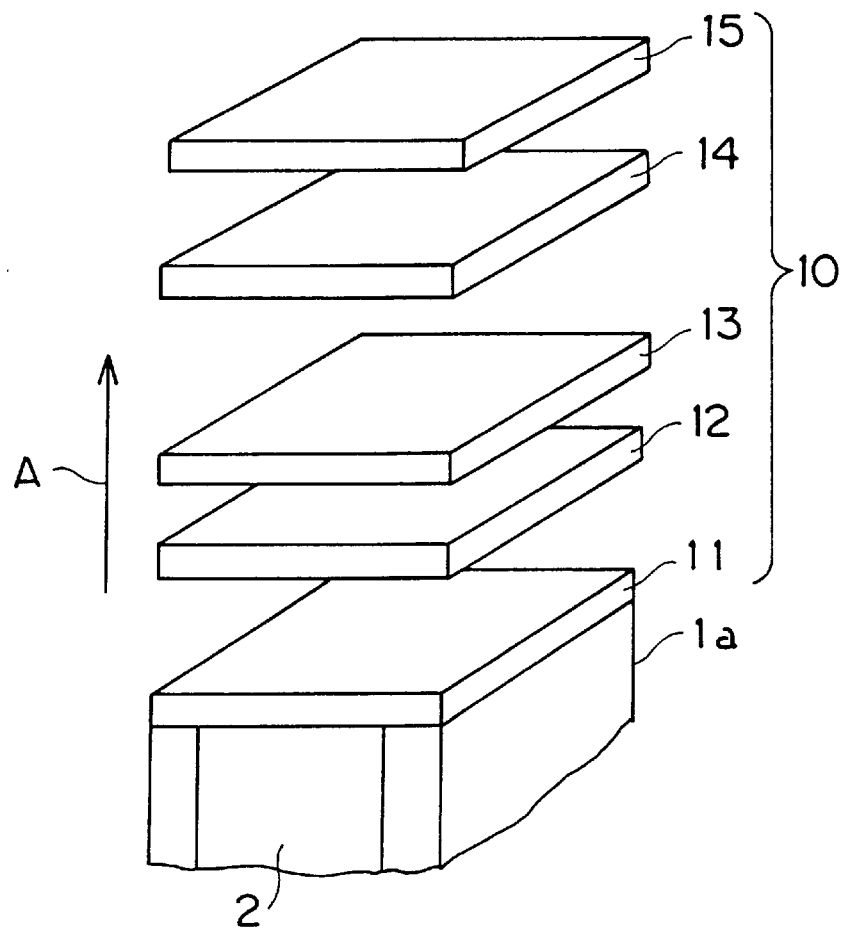
FIG. 1 is an exploded perspective view showing a thin-film magnetic head having a head forming layer which is formed by a recording head forming layer and a reproducing head forming layer being stacked with each other through a separation layer.

FIG. 1 is an exploded perspective view for illustrating the head part 10 shown in FIG. 2 in further detail. The shapes of the respective layers forming the head part 10 are simplified in FIG. 1, and hence the shape of the head part 10 is illustrated differently from that shown in FIG. 2. Referring to FIG. 1, a lower protective layer 11, a reproducing head forming layer 12, a separation layer 13, a recording head forming layer 14 and an upper protective layer 15 are successively stacked on a substrate 2.

The reproducing head forming layer 12 is provided with a magnetic head consisting of a magnetoresistive element (MR element) or the like, for example. The electric resistance of such an MR element is varied with change of an applied magnetic field. Therefore, it is possible to detect changes of the magnetic field by feeding a current to the MR element and detecting the change of its electric resistance, thereby reading information recorded in a magnetic recording medium.

The recording head forming layer 14 is stacked on the reproducing head forming layer 12 through the separation layer 13. The recording head forming layer 14 is provided with an inductive magnetic head, for example. When the recording head forming layer 14 is provided independently of the reproducing head forming layer 12 as shown in FIG. 1, the inductive magnetic head is provided as a magnetic head which is dedicated to recording. The inductive magnetic head, which can not only record but also reproduce information, although its reproducing sensitivity is inferior to that of an MR thin-film head, may alternatively be provided as a head for recording and reproduction. In this case, the lower protective layer 11 is provided on the substrate 2 so that the inductive thin-film magnetic head for recording and reproduction is provided on the lower protective layer 11 and the upper protective layer 15 is provided on the inductive thin-film magnetic head.

Both of the reproducing head forming layer 12 and the recording head forming layer 14 are multilayer structure layers forming the thin-film magnetic head 2 by stacking thin films.

In general, mother layers for the respective layers forming the head part 10 are stacked on a mother substrate, and the obtained mother thin-film magnetic head is cut into each thin-film magnetic head, which in turn is subjected to machining such as grinding. The lower protective layer 11, the upper protective layer 15 and the separation layer 13 are adapted to protect the head part 10 in such machining. These layers are also adapted to electrically insulate the layers interposed therebetween from each other.

According to the present invention, any one or more of the lower protective layer 11, the upper protective layer 15 and the separation layer 13 of the head part 10 shown in FIG. 1 is formed by a diamond-like carbon coating. When a head forming layer is formed by an inductive magnetic head for recording and reproduction or the like, either one of the lower protective layer 11 and the upper protective layer 15 is formed of a diamond-like carbon coating. A method of forming such a diamond-like carbon coating is not particularly restricted, but the coating can be formed by an ECR plasma CVD apparatus, for example.

Figure 3:
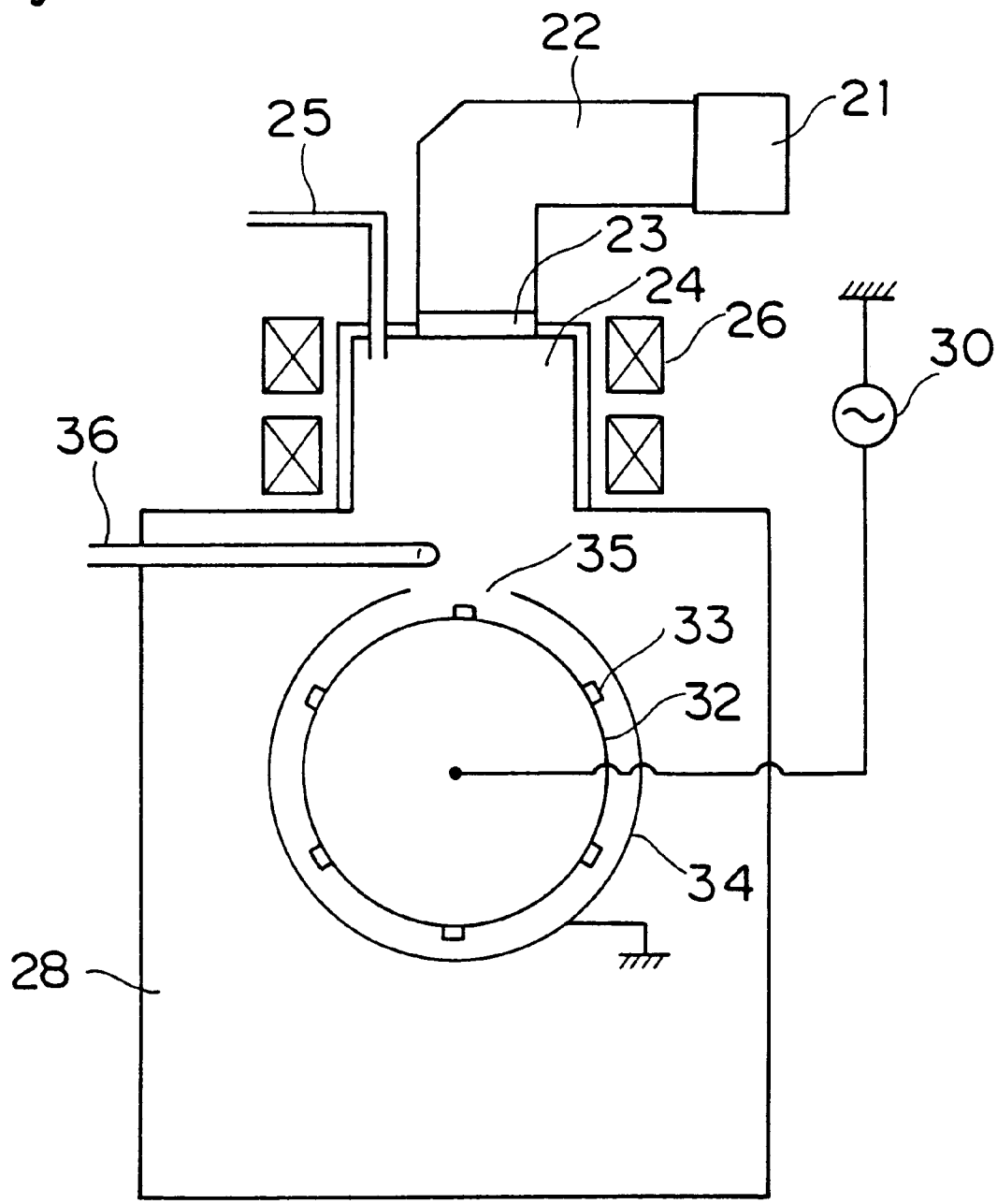
FIG. 3 is a schematic sectional view showing an exemplary ECR plasma CVD apparatus employed in an embodiment of the present invention.

FIG. 3 is a schematic sectional view showing an ECR plasma CVD apparatus which can form a diamond-like carbon coating. Referring to FIG. 3, a plasma generation chamber 24 is provided in a vacuum chamber 28. An end of a waveguide 22 is mounted on the plasma generation chamber 24. Microwave supply means 21 is provided on the other end of the waveguide 22. A microwave generated in the microwave supply means 21 is guided to the plasma generation chamber 24 through the waveguide 22 and a microwave inlet window 23. A discharge gas inlet tube 25 is provided in the plasma generation chamber 24, in order to introduce discharge gas such as argon (Ar) gas into the plasma generation chamber 24. A plasma magnetic field generator 26 is provided around the plasma generation chamber 24. A high-frequency magnetic field formed by the microwave and a magnetic field from the plasma magnetic field generator 26 are made to act for forming a plasma of high density in the plasma generation chamber 24.

A cylindrical substrate holder 32 is provided in the vacuum chamber 28. This substrate holder 32 is rotatable about a shaft (not shown) which is perpendicularly provided with respect to wall surfaces of the vacuum chamber 28. A plurality of thin-film magnetic head materials 33 serving as substrates are mounted on the periphery of the substrate holder 32 at regular intervals. A high-frequency power source 30 is connected to the substrate holder 32.

A cylindrical shielding cover 34 of a metal is provided around the substrate holder 32 at a prescribed distance. This shielding cover 34 is connected to a ground electrode. The shielding cover 34 is adapted to prevent discharge across portions of the substrate holder 32, other than those for forming coatings, and the vacuum chamber 28 by an RF voltage which is applied to the substrate holder 32 during formation of the coatings. The shielding cover 34 is so arranged that the distance between the same and the substrate holder 32 is not more than the mean free path of the gas molecules. In this embodiment, the shielding cover 34 is so arranged that the distance is at about 5 mm, which is not more than $1/10$ the mean free path of the gas molecules.

An opening 35 is formed in the shielding cover 34. Through this opening 35, the plasma, which is drawn out from the plasma generation chamber 24, is applied to the thin film magnetic head materials 33 which are mounted on the substrate holder 32. A reaction gas inlet tube 36 is provided in the vacuum chamber 28, so that its forward end is located above the opening 35.

Figure 4:
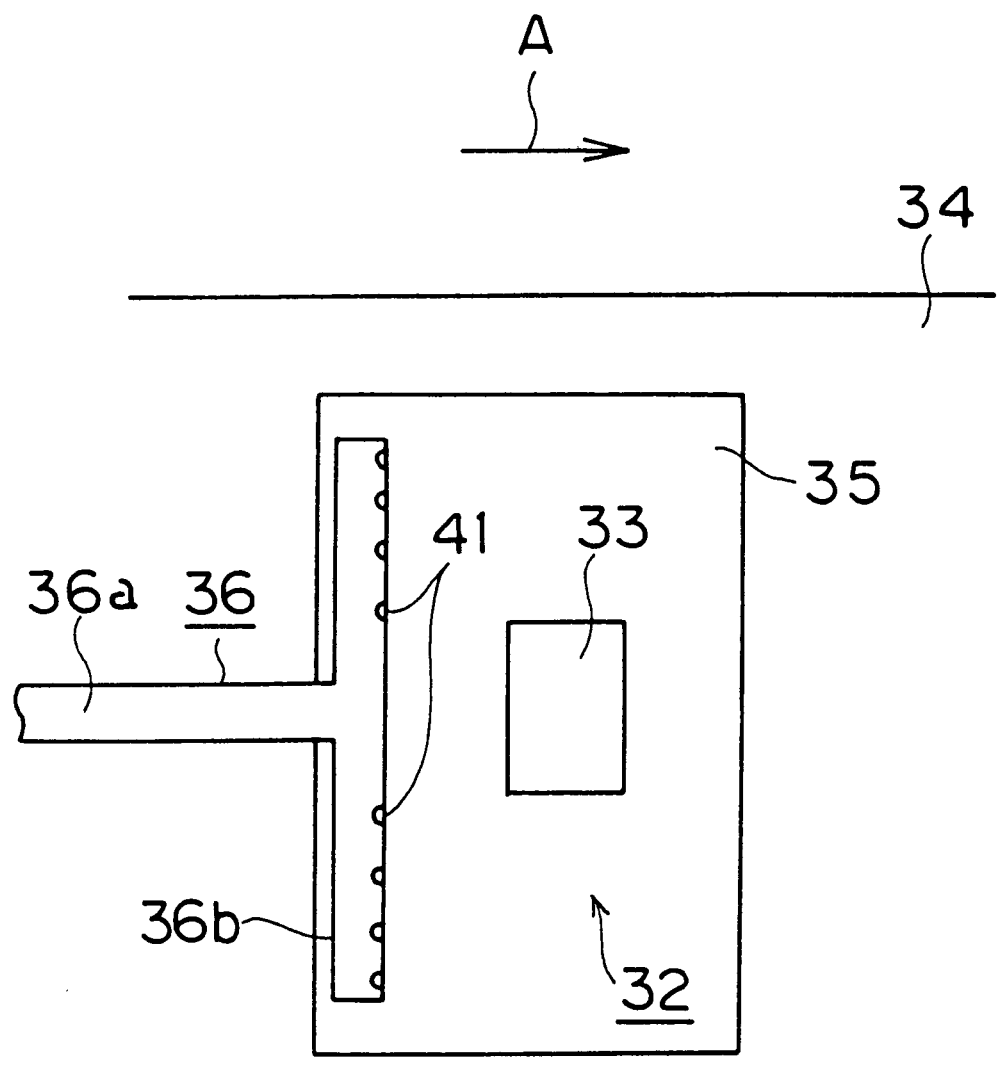
FIG. 4 is a plan view showing a portion around an opening of the apparatus shown in FIG. 3.

FIG. 4 is a plan view showing a portion around the forward end of the reaction gas inlet tube 36. Referring to FIG. 4, the reaction gas inlet tube 36 is formed by a gas inlet tube 36a for introducing raw material gas such as $CH_4$ gas into the vacuum chamber 28 from the exterior, and a gas discharge part 36b which is perpendicularly connected with the gas inlet tube 36a. The gas discharge part 36b is perpendicularly arranged with respect to a direction A of rotation of the substrate holder 32, to be positioned above the opening 35 upstream the direction of rotation. The gas discharge part 36b has a plurality of holes 41 which are provided in a downward direction at an angle of about 45°. According to this embodiment, the gas discharge part 36b has eight such holes 41.

The aforementioned ECR plasma CVD apparatus is employed to apply the plasma, which is drawn out from the plasma generation chamber 24, onto the thin-film magnetic head materials 33 which are mounted on the substrate holder 32 through the opening 35, while supplying the raw material gas such as $CH_4$ gas from the reaction gas inlet tube 36, thereby forming diamond-like carbon coatings on the thin-film magnetic head materials 33.

The apparatus shown in FIG. 3 was employed for forming diamond-like carbon coatings on Altic ($Al_2O_3$—TiC) substrates generally employed as substrates for thin-film magnetic heads in practice.

The vacuum chamber 28 was first evacuated to $10^{-5}$ to $10^{-7}$ Torr, the substrate holder 32 was rotated at a speed of about 10 rpm, and Ar gas was supplied from the discharge gas inlet tube 25 at $5.7 \times 10^4$ Torr. A microwave of 2.45 GHz and 100 W was supplied from the microwave supply means 21, to form an Ar plasma in the plasma generation chamber 24. This Ar plasma was applied to the surfaces of the Altic substrates through the opening 35. At the same time, an RF voltage of 13.56 MHz was applied to the substrate holder 32 from the high-frequency power source 30 so that self-bias voltages generated in the Altic substrates were –10 V, –20 V, –50 V and –150 V respectively, and $CH_4$ gas was supplied from the reaction gas inlet tube 36 at $1.3 \times 10^{-3}$ Torr.

Diamond-like carbon coatings of 1 μm in thickness were formed on the Altic substrates in the aforementioned manner.

For the purpose of comparison, an $Al_2O_3$ film was formed on an Altic substrate by ion plating.

The coatings formed in the aforementioned manner were subjected to measurement of hardness (Vickers hardness). Table 1 shows the results of the measurement.

TABLE 1

|  | Diamond-Like Carbon Coating | | | | $Al_2O_3$ Film |
| --- | --- | --- | --- | --- | --- |
| Self-Bias Voltage (V) | –10 | –20 | –50 | –150 | — |
| Hardness (kg/mm²) | 2000 | 3000 | 3100 | 3400 | 1200 |

It is clearly understood from Table 1 that each diamond-like carbon coating is extremely harder than the generally employed $Al_2O_3$ film.

The diamond-like carbon coating, having a hardness of 3000 kg/mm² which was formed by applying the RF voltage so that the self-bias voltage was –20 V, was subjected to an abrasion test. A jig provided with abrasive grains for grinding was brought into contact with the diamond-like carbon coating which was formed on the Altic substrate, and reciprocated for making the abrasion test. Wear resistance was evaluated by measuring the abrasion loss. The abrasion loss was calculated from that in the direction of depth.

For the purpose of comparison, an $Al_2O_3$ film which was formed on an Altic substrate was also subjected to evaluation of wear resistance.

Consequently, the abrasion loss of the diamond-like carbon coating was 1 while that of the comparative $Al_2O_3$ film was 1.5. Thus, it is understood that the diamond-like carbon coating is superior in wear resistance.

It is clearly understood from the above results that the diamond-like carbon coating is extremely superior in wear resistance to the conventional $Al_2O_3$ film. Thus, it is understood that the diamond-like carbon coating is excellent in head protectiveness. When the upper or lower protective layer is formed by a diamond-like carbon coating according to the present invention, its thickness can be reduced as compared with the conventional $Al_2O_3$ film, which required a thickness of about 30 to 40 μm for serving as an upper or lower protective layer, to below 10 μm, for example, due to such excellent wear resistance.

Further, each of the diamond-like carbon coatings shown in Table 1 exhibited specific resistance of about $5 \times 10^8$ Ω·cm. Thus, it is understood that the diamond-like carbon coating has a sufficient insulation property required for an upper protective layer, a lower protective layer or a separation layer.

The diamond-like carbon coating which was formed with the self-bias voltage of –50 V exhibited a hydrogen content of 13 at. %.

A sample of the thin-film magnetic head 1 shown in FIG. 1 was prepared by forming the lower protective layer 11, the separation layer 13 and the upper protective layer 15 of diamond-like carbon coatings. The diamond-like carbon coatings were formed by the apparatus shown in FIG. 3. The thicknesses of the lower protective layer 11, the separation layer 13 and the upper protective layer 15 were 15 μm, 3 μm and 15 μm respectively. It was possible to polish the thin-film magnetic head which was cut out from a mother thin-film magnetic head without damaging its head part in such machining. Further, it was possible to use the obtained thin-film magnetic head with no problem in an ordinary used state for recording/reproduction.

Description is now made of an Example of a diamond-like carbon coating containing $SiO_2$.

Figure 5:
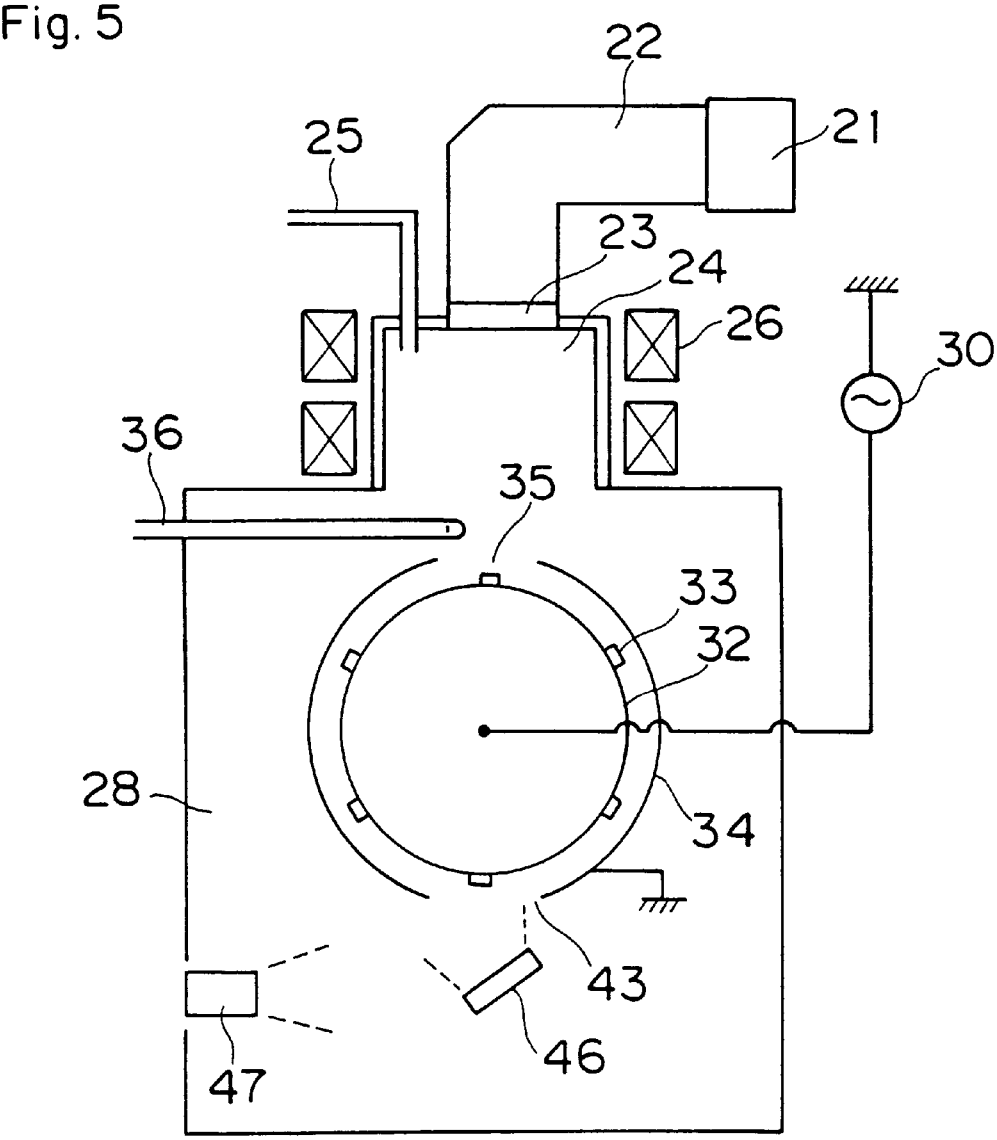
FIG. 5 is a schematic sectional view showing another exemplary ECR plasma CVD apparatus employed in an Example of the present invention.

The diamond-like carbon coating was formed by an ECR plasma CVD apparatus shown in FIG. 5. The apparatus shown in FIG. 5 is formed by adding an ion sputtering apparatus to the ECR plasma CVD apparatus shown in FIG. 3. Portions corresponding to those of the apparatus shown in FIG. 3 are denoted by the same reference numerals. Referring to FIG. 5, a second opening 43 is provided in a lower portion of a shielding cover 34. A target 46 is provided in the vicinity of the second opening 43. Further, an ion gun 47 is provided in a vacuum chamber 28, in order to apply ions to the target 46. In this example, the target 46 consists of Si.

The apparatus shown in FIG. 5 was employed to form a thin diamond-like carbon coating containing $SiO_2$.

First, the vacuum chamber 28 was evacuated to $10^{-5}$ to $10^{-7}$ Torr, and a substrate holder 32 was rotated at a speed of about 10 rpm. Then, oxygen was introduced into the vacuum chamber 28 and Ar gas was supplied to the ion gun 47 for producing Ar ions, which in turn were applied to the surface of the target 46 consisting of Si. At this time, the acceleration voltage for the Ar ions and the ion current density were set at 900 eV and 0.4 mA/cm$^2$ respectively. The oxygen partial pressure was set at $1 \times 10^{-4}$ Torr.

Then, Ar gas was supplied from a discharge gas inlet tube 25 of the ECR plasma CVD apparatus at $2 \times 10^{-4}$ Torr while a microwave of 2.45 GHz and 100 W was supplied from microwave supply means 21 to form an Ar plasma in a plasma generation chamber 24, and this Ar plasma was applied to surfaces of thin-film magnetic head materials 33 through a first opening 35. At the same time, an RF voltage of 13.56 MHz was applied to a substrate holder 32 from a high-frequency power source 30 so that self-bias voltages generated in the thin-film magnetic head materials 33 were −20 V, and CH$_4$ gas was supplied from a reaction gas inlet tube 36 at $3.0 \times 10^{-4}$ Torr.

The above steps were carried out for about 100 minutes, thereby forming diamond-like carbon coatings of 20 μm in thickness, in which SiO$_2$ was homogeneously dispersed/contained, on Altic substrates serving as the thin-film magnetic head materials.

50 samples were prepared by forming diamond-like carbon coatings containing 20 wt. % of SiO$_2$ on Altic substrates in the aforementioned manner, and subjected to evaluation of adhesion. For the purpose of comparison, 50 samples were prepared by forming diamond-like carbon coatings containing no SiO$_2$ on Altic substrates with a self-bias voltage of −10 V, and subjected to evaluation of adhesion. The adhesion was evaluated by an indentation test under a constant load of 1 kg with a Vickers indenter. The number of the carbon coatings which were directly formed on the Altic substrates but separated from the same was counted for evaluating adhesion.

Consequently, the diamond-like carbon coatings containing no SiO$_2$ were separated in 10 of the samples, while none of the diamond-like carbon coatings containing SiO$_2$ separated from the Altic substrates.

Description is now made of an Example of a diamond-like carbon coating containing Si. The carbon coating was formed by employing the apparatus shown in FIG. 5 similarly to those containing SiO$_2$, except that no oxygen was supplied into the vacuum chamber 28.

50 samples were prepared by forming diamond-like carbon coatings containing 10 wt. % of Si on Altic substrates similarly to the above, and subjected to evaluation of adhesion. None of these coatings separated from the substrates.

Figure 6:
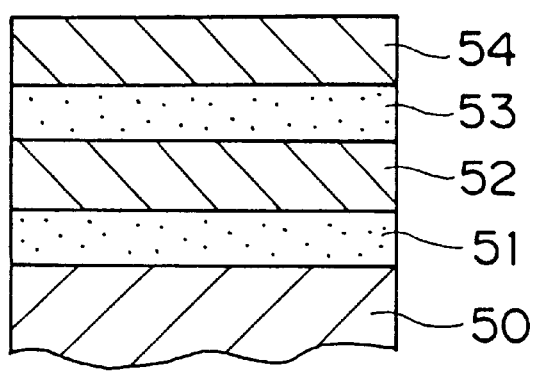
FIG. 6 is a sectional view showing a multilayer structure of a diamond-like carbon coating in another Example of the present invention.

Description is now made of an Example of a diamond-like carbon coating provided therein with stress relaxation layers consisting of SiO$_2$. The apparatus shown in FIG. 5 was employed and each substrate arranged on the substrate holder 32 was fixed at positions under the first and second openings 35 and 43 for prescribed times respectively, to form a thin film of a multilayer structure. FIG. 6 is a sectional view showing the multilayer structure of the thin film. As shown in FIG. 6, an SiO$_2$ layer 51 of 1 μm in thickness serving as a stress relaxation layer, a diamond-like carbon coating 52 of 9 μm in thickness, an SiO$_2$ layer 53 of 1 μm in thickness serving as a stress relaxation layer, and a diamond-like carbon coating 54 of 9 μm in thickness were successively formed on an Altic substrate 50. There layers were formed substantially similarly to the aforementioned coatings containing SiO$_2$, except that the substrate was fixed at the aforementioned positions of the substrate holder 32.

50 samples were prepared by forming diamond-like carbon coatings of the aforementioned multi-layer structure on Altic substrates, and subjected to evaluation of adhesion similarly to the above. None of the coatings separated from the substrates.

From the above, it is clearly understood that it is possible to relax stress and improve adhesion by providing a stress relaxation layer of an SiO$_2$ film.

While a stress relaxation component or the stress relaxation layer is prepared from SiO$_2$ or Si in the above Example, it has been confirmed that effects of improving adhesion can be similarly attained with Al, Ti, Zr and oxides and nitrides thereof.

Figure 7:
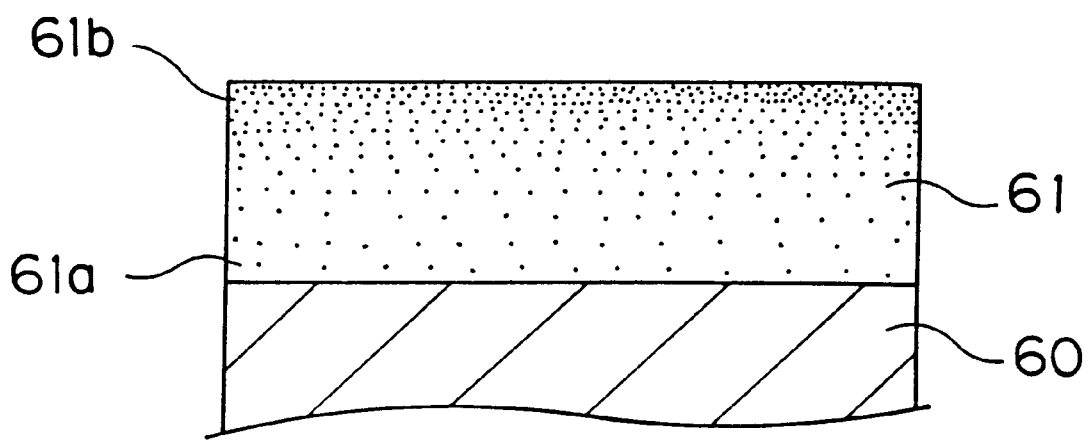
FIG. 7 is a sectional view showing a diamond-like carbon coating according to another embodiment of the present invention.

FIG. 7 is a sectional view showing a diamond-like carbon coating 61 according to another embodiment of the present invention. In the embodiment shown in FIG. 7, the diamond-like carbon coating 61 is formed on a substrate 60. The diamond-like carbon coating 61 is formed to have such an inclined structure that its composition is continuously varied from the substrate 60 toward the surface of the coating 61. In other words, the hydrogen concentration of the coating 61 is reduced from a portion 61a around the interface between the coating 61 and the substrate 60 toward a portion 61b around the surface of the coating 61. Further, the coating 61 is so formed that its internal stress, hardness and refractive index are increased and its conductivity is reduced in a similar manner to the above.

Figure 8:
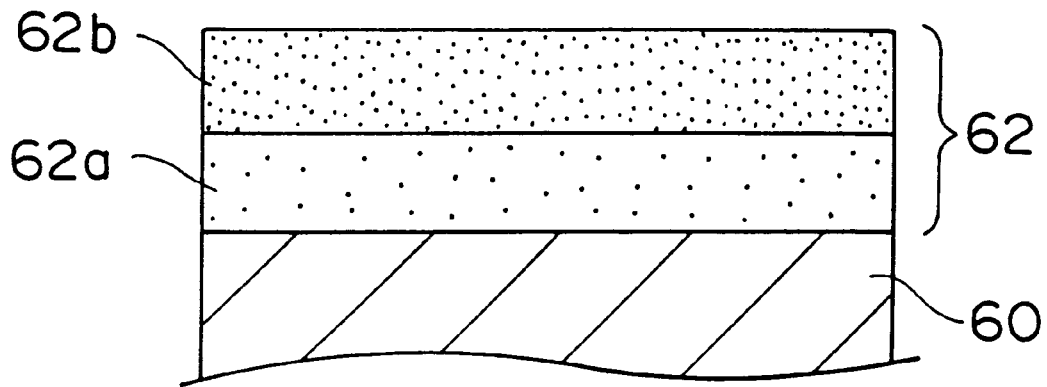
FIG. 8 is a sectional view showing a diamond-like carbon coating according to still another embodiment of the present invention.

FIG. 8 is a sectional view showing a diamond-like carbon coating 62 according to still another embodiment of the present invention. In the embodiment shown in FIG. 8, the diamond-like carbon coating 62 is formed on a substrate 60. This diamond-like carbon coating 62 is formed as a two-layer structure of coating layers 62a and 62b. The coating layer 62a has excellent adhesion with respect to the substrate 60, and is relatively higher in hydrogen concentration and conductivity and relatively lower in internal stress, hardness and refractive index as compared with the coating layer 62b.

The diamond-like carbon coating according to the present invention may have a two-layer structure as shown in FIG. 8, or a multilayer structure comprising three or more layers. As the number of the layers is increased, an inclined structure having a continuously varied composition is finally attained as shown in FIG. 7.

Description is now made of an Example of the diamond-like carbon coating shown in FIG. 7 which was formed on an Ni alloy substrate by employing the apparatus shown in FIG. 3.

Figure 9:
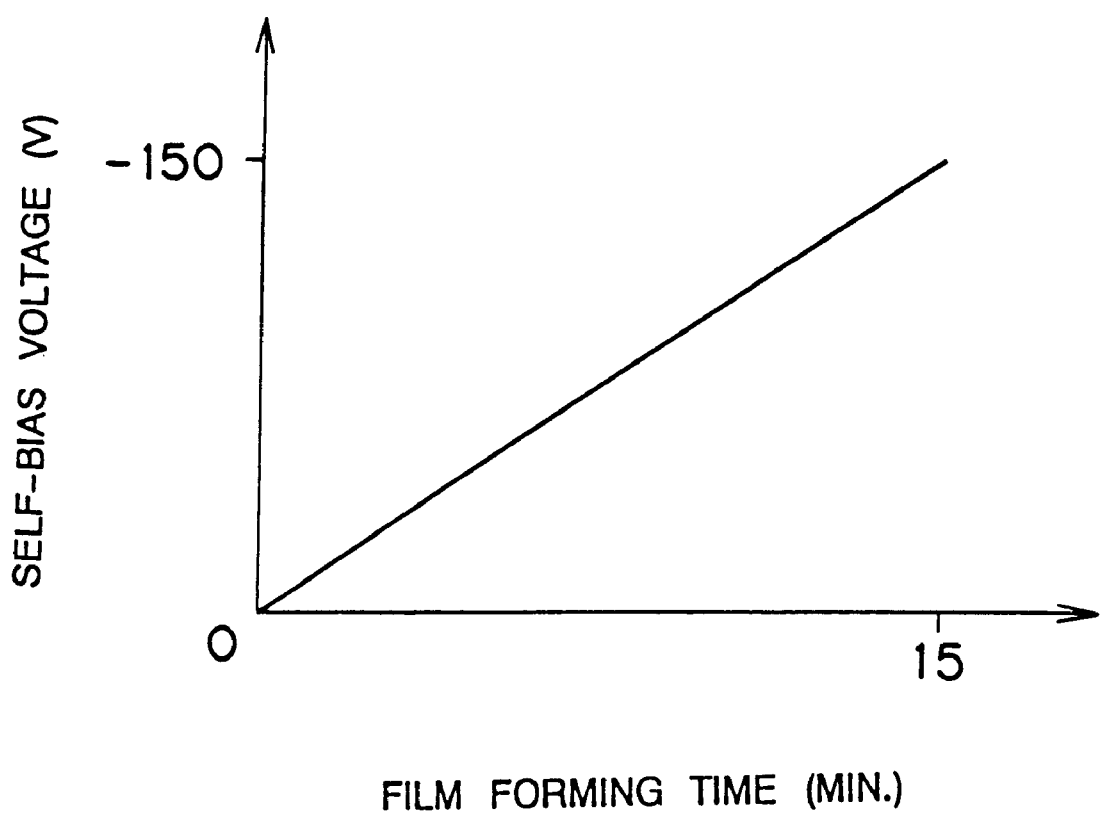
FIG. 9 illustrates the relation between a film forming time and a self-bias voltage in still another Example of the present invention.

First, the vacuum chamber 28 was evacuated to $10^{-5}$ to $10^{-7}$ Torr, and the substrate holder 32 was rotated at a speed of about 10 rpm. Then, Ar gas was supplied from the discharge gas inlet tube 25 at $5.7 \times 10^{-4}$ Torr and a microwave of 2.45 GHz and 100 W was supplied from the microwave supply means 21, and an Ar plasma formed in the plasma generation chamber 24 was applied to the surface of each substrate 33. At the same time, CH$_4$ gas was supplied from the reaction gas inlet tube 36 at $1.3 \times 10^{-3}$ Torr, while RF power of 13.56 MHz was applied to the substrate 32 from the high-frequency power source 30. The RF power applied to the substrate holder 32 was so adjusted that the self-bias voltage generated in the substrate was 0 V at an initial stage of film formation and −150 V after 15 minutes from completion of film formation, as shown in FIG. 9.

Through the aforementioned steps, a diamond-like carbon coating of 1200 Å in thickness was formed on the Ni alloy substrate.

Figure 10:
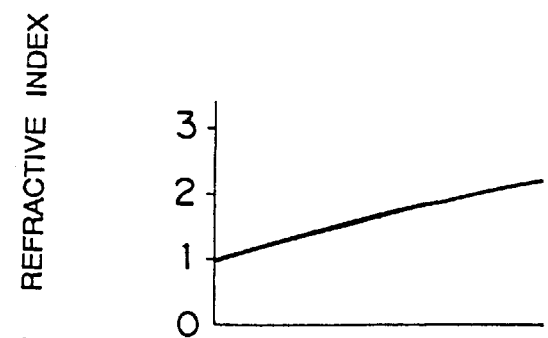
FIG. 10 illustrates the relations between a self-bias voltage and refractive index, conductivity, hardness, internal stress and hydrogen concentration respectively.
Figure 10:
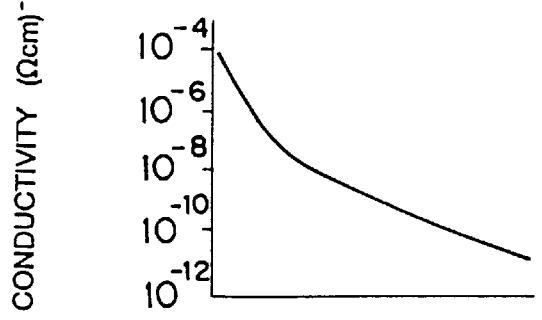
Figure 10:
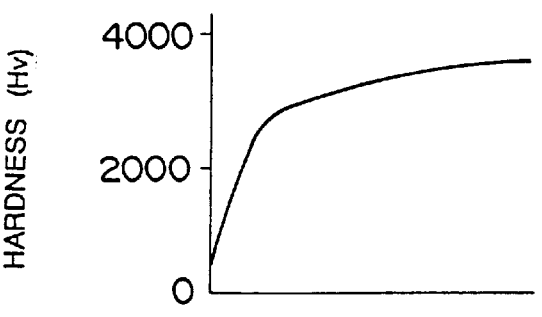
Figure 10:
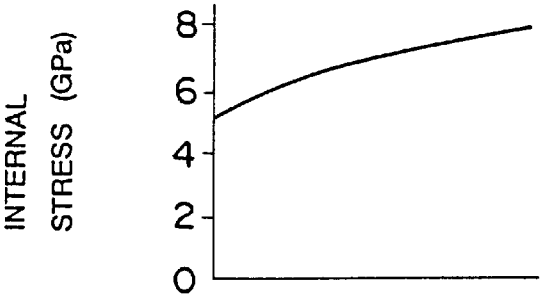
Figure 10:
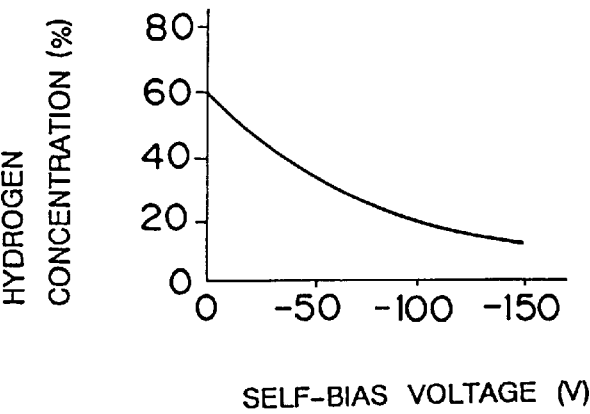

FIG. 10 illustrates the relationship between the self-bias voltage generated in the substrate holder and the refractive index, conductivity, hardness, internal stress and hydrogen concentration of the diamond-like carbon coating formed at the self-bias voltage. These values were obtained by forming a diamond-like carbon coating in the apparatus shown in FIG. 3, under a condition wherein making the self-bias voltage generated in the substrate holder is constant, and measuring the respective characteristics of the obtained diamond-like carbon coating. FIG. 10 was formed by measuring the characteristic values while varying the self-bias voltage, thereby obtaining these values.

It is clearly understood from FIG. 10 that the refractive index is about 1.0, the conductivity is about $10^{-4}$ $(\Omega cm)^{-1}$, the hardness is about 850 Hv, the internal stress is about 5 GPa and the hydrogen concentration is about 60% when the self-bias voltage is 0 V. It is also understood that the refractive index is about 2.5, the conductivity is about $10^{-11}$ $(\Omega cm)^{-1}$, the hardness is about 3400 Hv, the internal stress is about 8 GPa and the hydrogen concentration is about 10% when the self-bias voltage is –150 V.

Therefore, the variation of the respective characteristics shown in FIG. 10 is accomplished in the direction of thickness in the aforementioned diamond-like carbon coating when the self-bias voltage is varied from 0 to –150 V as the formation of the coating progresses. Thus, it is understood that the hardness as well as the internal stress are small in the portion 61a around the interface between the diamond-like carbon coating 61 and the substrate 60 to attain a composition having excellent adhesion with respect to the substrate 60. It is also understood that the hardness etc. are increased in the portion 61b around the coating surface, to attain high hardness required for the diamond-like carbon coating.

Figure 11:
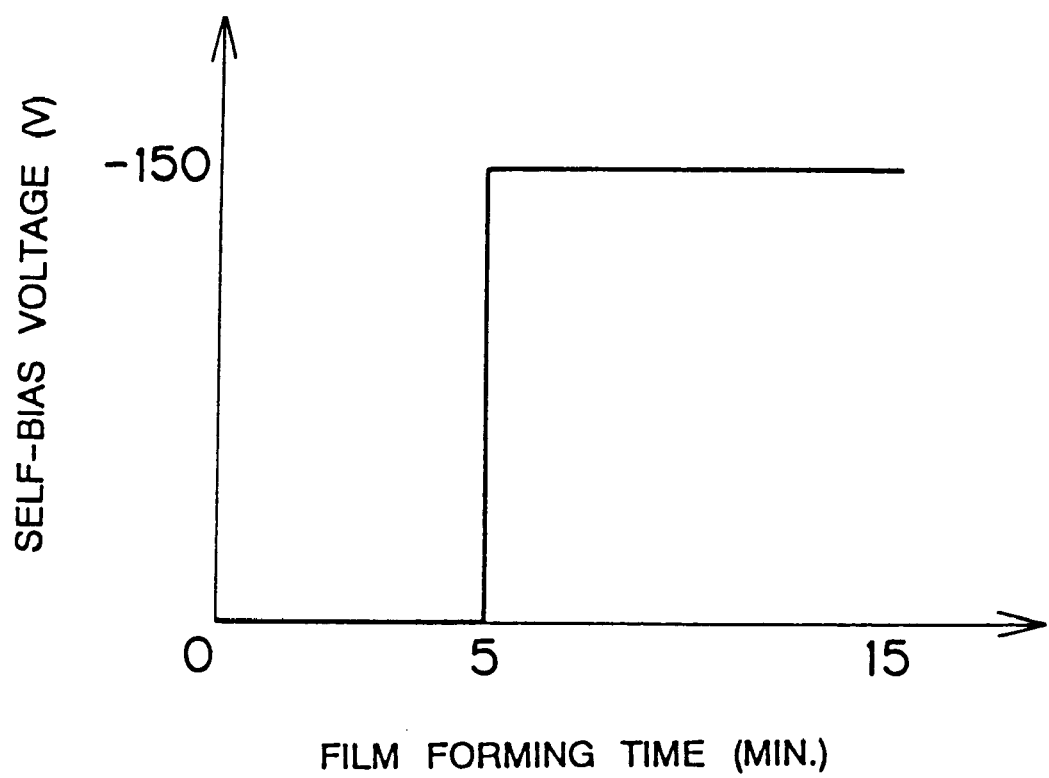
FIG. 11 illustrates the relation between a film forming time and a self-bias voltage in a further Example of the present invention.

In addition to a diamond-like carbon coating (Example A) having the inclined structure shown in FIG. 7, a diamond-like carbon coating (Example B) having the two-layer structure shown in FIG. 8 was formed under film forming conditions similar to those for Example A except for the self-bias voltage. The self-bias voltage was set to be 0 V for 5 minutes from starting of film formation, and –150 V for following 10 minutes, as shown in FIG. 11. A diamond-like carbon coating of 1200 Å in thickness was formed on an Ni alloy substrate through such a step. A portion of the coating formed with the self-bias voltage of 0 V corresponds to the coating layer 62a shown in FIG. 8, and that formed with the self-bias voltage of –150 V corresponds to the coating layer 62b.

For the purpose of comparison, diamond-like carbon coatings (Examples C and D) were formed under conditions identical to those for Examples A and B except that the self-bias voltages generated in the substrate holder were set at constant values of –150 V and 0 V during film formation, respectively.

The diamond-like carbon coatings according to Examples A to D obtained in the aforementioned manner were subjected to an evaluation test for adhesion. The adhesion was evaluated by an indentation test under a constant load of 1 kg with a Vickers indenter. 50 samples were prepared for each Example, and the number of samples causing separation of the diamond-like carbon coatings from the Ni alloy substrates was counted. Table 2 shows the results of the evaluation.

TABLE 2

|  | Example A | Example B | Example C | Example D |
|---|---|---|---|---|
| Number of Separated Coatings | 2 | 5 | 49 | 5 |

It is clearly understood that the numbers of separated diamond-like carbon coatings in the samples according to Examples A and B are by far smaller than that of Example C. Thus, it is understood that a diamond-like carbon coating having excellent adhesion with respect to a substrate can be obtained by varying the coating composition in the direction of its thickness.

On the other hand, Table 3 shows the results of measurement of hardness of the diamond-like carbon coatings according to Examples A to D.

TABLE 3

|  | Example A | Example B | Example C | Example D |
|---|---|---|---|---|
| Hardness (Hv) | 3400 | 3400 | 3400 | 850 |

It is clearly understood from Table 3 that the diamond-like carbon coatings according to Examples A and B have high hardness which is equivalent to that of Example C. It is also understood that the diamond-like carbon coating according to Example D has extremely low hardness, although the same is excellent in adhesion with a small number of separations as shown in Table 2.

From the aforementioned results, it is understood that a diamond-like carbon coating whose composition is varied in the direction of its thickness has sufficiently high hardness and is excellent in adhesion.

While the diamond-like carbon coatings were formed through the ECR plasma CVD apparatuses in the aforementioned Examples, the diamond-like carbon coating according to the present invention is not restricted to such a formation method.

Although the diamond-like carbon coatings were directly formed on the substrates in the aforementioned Examples, a substrate may alternatively be provided with an underlayer, such as a silicon layer, so that the diamond-like carbon coating is formed on this substrate, in order to further improve adhesion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thin-film magnetic head comprising:
   an upper protective layer;
   a lower protective layer; and
   a head forming layer provided between said upper and lower protective layers,
   wherein at least one of said upper and lower protective layers comprises a diamond-like carbon coating, and wherein a stress relaxation layer comprising at least one material selected from the group consisting of Si, Al, Ti, Zr, and oxides and nitrides thereof is interposed in said diamond-like carbon coating, such that said diamond-like carbon coating is divided into a plurality of diamond-like carbon layers, said diamond-like carbon layers each having top and bottom surfaces, said stress relaxation layer having upper and lower opposing surfaces, said upper surface of said stress relaxation layer being in contact with said bottom surface of one of said diamond-like carbon layers, said lower surface of said stress relaxation layer being in contact with said top surface of another of said diamond-like carbon coating layers.

2. The thin-film magnetic head in accordance with claim 1, wherein the hardness of said diamond-like carbon coating is at least 2000 kg/mm$^2$.

3. The thin-film magnetic head in accordance with claim 1, wherein the specific resistance of said diamond-like carbon coating is at least $10^7$ Ω·cm.

4. The thin-film magnetic head in accordance with claim 1, wherein said diamond-like carbon coating comprises at least 5 at. % hydrogen.

5. The thin-film magnetic head in accordance with claim 1, wherein each said diamond-like carbon layer has a thickness, at least one of said diamond-like carbon layers having a composition which is varied in the direction of said thickness of said at least one said diamond-like carbon layer such that said at least one diamond-like carbon layer has a hydrogen concentration of 60 to 40 at. % around said bottom surface of said at least one of said diamond-like carbon layers and 30 to 10 at. % around said top surface of said at least one of said diamond-like carbon layers.

6. The thin-film magnetic head in accordance with claim 5, wherein a substrate comprises at least one material selected from Ni, Al, stainless steel, ceramics and alloys thereof.

7. The thin-film magnetic head in accordance with claim 5, wherein said diamond-like carbon coating is formed by setting a substrate on a substrate holder, and irradiating said substrate holder with a plasma containing reaction gas while varying said composition of said at least one diamond-like carbon layer in the direction of said thickness of said at least one diamond-like carbon layer by varying self-bias voltage being generated in said substrate holder, said reaction gas serving as the raw material for said diamond-like carbon coating.

8. The thin-film magnetic head in accordance with claim 1, wherein each said diamond-like carbon layer has a thickness, at least one of said diamond-like carbon layers having a composition which is varied in the direction of said thickness of said at least one diamond-like carbon layer such that said at least one diamond-like carbon layer has an internal stress of 5 to 6 GPa around said bottom surface of said at least one of said diamond-like carbon layers and 7 to 8 GPa around said top surface of said at least one of said diamond-like carbon layers.

9. The thin-film magnetic head in accordance with claim 1, wherein each said diamond-like carbon layer has a thickness, at least one of said diamond-like carbon layers having a composition which is varied in the direction of said thickness of said at least one diamond-like carbon layer such that said at least one diamond-like carbon layer has a hardness of 500 to 2000 Hv around said bottom surface of said at least one of said diamond-like layers and 3000 to 3400 Hv around said top surface of said at least one of said diamond-like carbon layers.

10. The thin-film magnetic head in accordance with claim 1, wherein each said diamond-like carbon layer has a thickness, at least one of said diamond-like carbon layers having a composition which is varied in the direction of said thickness of said at least one diamond-like carbon layer such that said at least one diamond-like carbon layer has a conductivity of $10^{-4}$ to $10^{-7}$ $(\Omega cm)^{-1}$ around said bottom surface of said at least one of said diamond-like layers and $10^{-10}$ to $10^{-11}$ $(\Omega cm)^{-1}$ around said top surface of said at least one of said diamond-like carbon layers.

11. The thin-film magnetic head in accordance with claim 1, wherein each said diamond-like carbon layer has a thickness, at least one of said diamond-like carbon layers having a composition which is varied in the direction of said thickness of said at least one diamond-like carbon layer such that said at least one diamond-like carbon layer has a refractive index of 1.0 to 1.5 around said bottom surface of said at least one of said diamond-like layers and 2.0 to 2.5 around said top surface of said at least one of said diamond-like carbon layers.

12. The thin film magnetic head in accordance with claim 1, wherein said diamond-like coating has a specific resistance in the range of from $10^7$ to 10 Ω·cm.

13. The thin film magnetic head in accordance with claim 1, wherein a plurality of said stress relaxation layers are interposed in said diamond-like carbon coating.

14. A thin-film magnetic head comprising:
an upper protective layer;
a lower protective layer; and
a head forming layer provided between said upper and lower protective layers, said head forming layer comprising a recording head forming layer, a reproducing head forming layer, and a separation layer provided between said recording and reproducing head forming layers,
wherein at least one of said upper protective layer, said lower protective layer and said separation layer comprises a diamond-like carbon coating, and wherein a stress relaxation layer comprising at least one material selected from the group consisting of Si, Al, Ti, Zr, and oxides and nitrides thereof is interposed in said diamond-like carbon coating, such that said diamond-like carbon coating is divided into a plurality of diamond-like carbon layers, said diamond-like carbon layers each having top and bottom surfaces, said stress relaxation layer having upper and lower opposing surfaces, said upper surface of said stress relaxation layer being in contact with said bottom surface of one of said diamond-like carbon layers, said lower surface of said stress relaxation layer being in contact with said top surface of another of said diamond-like carbon layers.

15. The thin film magnetic head in accordance with claim 14, wherein a plurality of said stress relaxation layers are interposed in said diamond-like carbon coating.

16. The thin-film magnetic head in accordance with claim 14, wherein the hardness of said diamond-like carbon coating is at least 2000 kg/mm².

17. The thin-film magnetic head in accordance with claim 14, wherein the specific resistance of said diamond-like carbon coating is at least $10^7$ Ω·cm.

18. The thin-film magnetic head in accordance with claim 14, wherein said diamond-like carbon coating comprises at least 5 at. % hydrogen.

19. The thin-film magnetic head in accordance with claim 14, wherein each said diamond-like carbon layer has a thickness, at least one of said diamond-like carbon layers having a composition which is varied in the direction of said thickness of said at least one diamond-like carbon layer such that said at least one diamond-like carbon layer has a hydrogen concentration of 60 to 40 at. % around said bottom surface of said at least one of said diamond-like layers and 30 to 10 at. % around said top surface of said at least one of said diamond-like carbon layers.

20. The thin-film magnetic head in accordance with claim 19, wherein one of said diamond-like carbon layers is in contact with a substrate, said substrate comprising at least one material selected from Ni, Al, stainless steel, ceramics and alloys thereof.

21. The thin-film magnetic head in accordance with claim 19, wherein each said diamond-like carbon layer is formed by irradiating with a plasma containing reaction gas while varying said composition of said at least one diamond-like carbon layer in the direction of said thickness of said at least one diamond-like carbon layer by varying self-bias voltage being generated in a substrate holder, said reaction gas serving as the raw material for said diamond-like carbon coating.

22. The thin-film magnetic head in accordance with claim 14, wherein each said diamond-like carbon layer has a thickness, at least one of said diamond-like carbon layers having a composition which is varied in the direction of said thickness of said at least one diamond-like carbon layer such that said at least one diamond-like carbon layer has an internal stress of 5 to 6 GPa around said bottom surface of said at least one of said diamond-like layers and 7 to 8 GPa around said top surface of said at least one of said diamond-like carbon layers.

23. The thin-film magnetic head in accordance with claim 14, wherein each said diamond-like carbon layer has a thickness, at least one of said diamond-like carbon layers having a composition which is varied in the direction of said thickness of said at least one diamond-like carbon layer such that said at least one diamond-like carbon layer has a hardness of 500 to 2000 Hv around said bottom surface of said at least one of said diamond-like layers and 3000 to 3400 Hv around said top surface of said at least one of said diamond-like carbon layers.

24. The thin-film magnetic head in accordance with claim 14, wherein each said diamond-like carbon layer has a thickness, at least one of said diamond-like carbon layers having a composition which is varied in the direction of said thickness of said at least one diamond-like carbon layer such that said at least one diamond-like carbon layer has a conductivity of $10^{-4}$ to $10^{-7}$ $(\Omega cm)^{-1}$ around said bottom surface of said at least one of said diamond-like layers and $10^{-10}$ to $10^{-11}$ $(\Omega cm)^{-1}$ around said top surface of said at least one of said diamond-like carbon layers.

25. The thin-film magnetic head in accordance with claim 14, wherein each said diamond-like carbon layer has a thickness, at least one of said diamond-like carbon layers having a composition which is varied in the direction of said thickness of said at least one diamond-like carbon layer such that said at least one diamond-like carbon layer has a refractive index of 1.0 to 1.5 around said bottom surface of said at least one of said diamond-like layers and 2.0 to 2.5 around said top surface of said at least one of said diamond-like carbon layers.

26. The thin film magnetic head in accordance with the claim 14, wherein said diamond-like coating has a specific resistance in the range of from $10^7$ to $10^{11}$ $\Omega \cdot cm$.

* * * * *